United States Patent

[11] 3,570,655

[72] Inventor Torahiko Hayashi
 2-3, Nozawa-machi, Utsunomiya-shi, Japan
[21] Appl. No. 783,298
[22] Filed Dec. 12, 1968
[45] Patented Mar. 16, 1971
[32] Priority Dec. 13, 1967
[33] Japan
[31] 42-79468

[54] MATERIAL CONVEYING APPARATUS
 10 Claims, 6 Drawing Figs.
[52] U.S. Cl. ................................................. 198/214, 198/216
[51] Int. Cl. .................................................. B65g 33/34
[50] Field of Search ........................................ 198/64, 213—217

[56] References Cited
UNITED STATES PATENTS
1,589,630  6/1926  Cooper ........................ 198/213
2,279,640  4/1942  Ringmarck ................... (198/214)UX
2,954,261  9/1960  Taupin ......................... 198/213X
3,381,801  5/1968  Rastoin ........................ 198/213

Primary Examiner—Robert G. Sheridan
Attorneys—Albert C. Johnston, Robert E. Isner, Lewis C. Johnston and Alvin Sinderbrand ABSTRACT: In a material conveying apparatus including inner and outer coaxial members, such as the shank of a conveyor screw and a tubular housing therefor, having confronting surfaces of revolution defining a space therebetween through which material is to be conveyed, and a helical rib extending along one of the coaxial members, for example, the shank to propel material axially in said space in response to rotation of the rib relative to the housing, at least a part of the shank is independently rotatable with respect to the turns of the rib extending along such part to permit control of the frictional resistance to turning of the material with the rotated helical rib.

INVENTOR
TORAHIKO HAYASHI
ATTORNEY

INVENTOR
TORAHIKO HAYASHI

BY
ATTORNEY

MATERIAL CONVEYING APPARATUS

This invention relates generally to material conveying apparatus, and is particularly directed to improvements in screw conveyors, for example, for conveying powdery, granular or viscous mixtures or compounds.

Heretofore, apparatus for conveying powdery, granular or viscous mixtures or compounds have usually employed a tubular housing having an inlet and outlet for the material to be conveyed at axially spaced locations and a conveyor screw rotatable in the housing and consisting of a shank with a helical rib or thread extending along the shank and integrally joined thereto. Thus, when the conveyor screw is rotated, only the inner surface of the housing frictionally resists the turning with the conveyor screw of the material situated between the successive turns of the rib or thread, whereas the frictional engagement of the turns of the rib and of the surface of the shank with the material between the turns tends to cause rotation of such material with the conveyor screw. The conveying efficiency is reduced to the extent that the material is made to turn with the conveyor screw by the frictional engagement with the latter. In fact, when the material to be conveyed is highly viscous, the conventional conveyor screw is either incapable of moving the material at all, or else can move only that part of the material adjacent to the stationary inner surface of the housing, with most of the energy employed for rotation of the screw being expended in overcoming the frictional forces produced within the material.

A further problem arises when the conveyed material are raw materials for food products. Food products often use raw materials whose quality is easily damaged by agitation. It has frequently been the case that such materials, when conveyed by a conventional screw, have been so damaged by agitation as to become completely unusable.

Still another difficulty with the conventional conveyor screw occurs in the delivery of mixed materials. Since cavities generally exist within any mixed material other than a liquid, the conventional conveyor screw tends to confine irregular masses of air within the housing, which in turn results in uneven delivery of the mixed material from the outlet.

Accordingly, it is an object of this invention to provide a screw conveyor apparatus which avoids the foregoing disadvantages and which has a high delivery capacity in connection with the conveying of powdery, granular or pasty or viscous materials.

Another object is to provide a screw conveyor apparatus suitable for the delivery of materials which are easily injured by agitation.

Still another object is to provide a screw conveyor apparatus which is capable of delivering mixed materials, in which cavities exist, without unevenness in the rate of discharge from the conveyor.

A further object of this invention is to provide a screw conveyor apparatus whose conveying power may be regulated in either the forward or reverse direction.

In accordance with an aspect of this invention, a material conveying apparatus comprises inner and outer coaxial members, for example, in the form of a conveyor screw shank and a cylindrical housing, respectively, having confronting surfaces of revolution defining a space therebetween through which the material is to be axially conveyed, and a helical rib or thread extending along the surface of one of the coaxial members, for example along the shank formed by the inner member, to propel material axially in said space in response to rotation of the rib relative to the housing, with at least a part of said one member, for example, the screw shank, being independently rotatable with respect to the turns of the helical rib extending along such part.

With a material conveying apparatus having the foregoing characteristic, certain materials, whose delivery by a screw conveyor has heretofore been impossible or difficult, can now be delivered with ease. Since at least part of the conveyor screw shank is formed separately from the conveyor screw thread or helical rib, the frictional resistance of the material to rotation of the conveyor screw thread can be appreciably reduced. Further, if the part of the screw shank which is independently rotatable relative to the turns of the screw thread extending therealong is held stationary or rotated in the direction opposed to the rotation of the screw thread, the frictional resistance to turning of the material with the screw thread is increased whereby to correspondingly increase the conveying efficiency, whereby the delivery rate of the conveyor is increased for a given rotational speed of the screw thread or the rotational speed can be reduced for achievement of a particular delivery rate. Further, since the area of contact of the material with rotated portions of the conveyor screw may be reduced, conveying apparatus according to this invention can achieve a corresponding reduction in agitation damage to the conveyed material. Injury to the material may also be avoided by making possible a lower rotational speed to achieve a particular delivery rate, as mentioned above.

It is also to be noted that the independent rotatability of the screw thread and at least part of the screw shank makes it possible to regulate the delivery power of the conveyor screw to any desired extent, even to the extent of effecting backward movement of the material.

The above, and other objects, features and advantages of the invention, will be apparent in the following detailed description of illustrative embodiments thereof which is to be read in connection with the accompanying drawing wherein.

Figure 1:
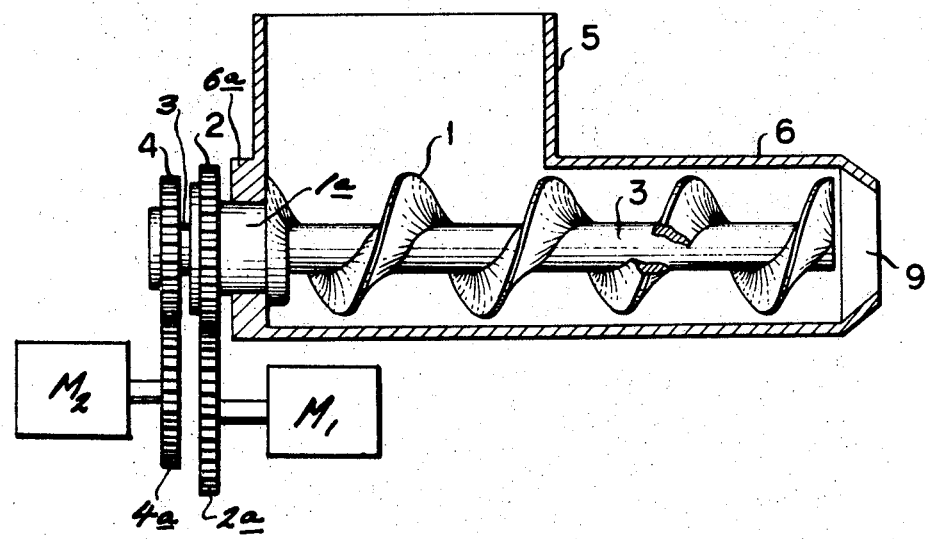
FIG. 1 is an axial sectional view of a material conveying apparatus according to one embodiment of this invention.

Referring to FIG. 1 in detail, it will be seen that a material conveying apparatus according to this invention, as there shown, comprises inner and outer coaxial members 3 and 6, constituting a screw shank and a housing, respectively, and having confronting surfaces of revolution defining a space therebetween through which the material is to be conveyed axially from a material inlet 5 to a material outlet 9 provided in housing 6 at axially spaced locations.

A helical rib or thread 1 extends along the surface of revolution of member or shank 3 and projects from the latter toward the other member or housing 6 so as to propel material along the space between members 3 and 6 in response to the rotation of rib 1 relative to member or housing 6.

In accordance with this invention, at least a part of shank or member 3 is formed separate from rib 1 and mounted for rotation independently of the turns of the rib extending along such part. For example, in the embodiment of FIG. 1, helical rib or thread 1 is independent of shank 3 along its entire length and is mounted for rotation independently of the shank. Such mounting of the helical rib 1 for rotation independently of shank 3 may be achieved, as shown, by joining one end of rib 1 to a sleeve 1a journaled in a bearing 6a at an end of housing 6, and by extending shank 3 axially through sleeve 1a in a manner to be rotatable relative to the latter. A gear 2 is fixed on sleeve 1a outside of housing 6 and a gear 4 is fixed on the end of shank 3 projecting from sleeve 1a so that helical rib 1 and shank 3 may be rotated independently of each other and with respect to housing 6, for example, as by suitably controlled, variable speed, reversible electric motors $M_1$ and $M_2$ driving gears 2a and 4a meshing with gears 2 and 4, respectively.

Figure 3:
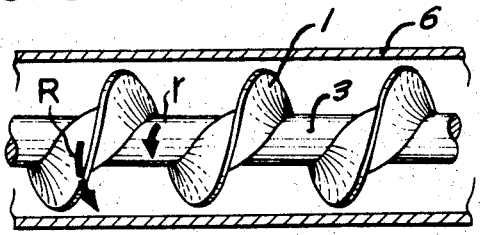
FIGS. 3 and 4 are fragmentary views of a portion of the apparatus shown on FIG. 1 and to which reference will be made in explaining the operation of such apparatus.
Figure 4:
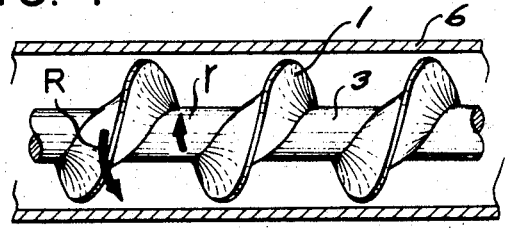

It will be apparent that, with the above described arrangement, helical rib rib 1 may be rotated in the direction to propel material from inlet 5 to outlet 9 while shank 3 is held at rest; or rib 1 and shank 3 may be rotated in the same direction, at the same or different speeds, as indicated by the arrows R and r on FIG. 3; or rib 1 and shank 3 may be rotated in opposed directions, at the same or different speeds, as indicated by the arrows R and r on FIG. 4.

Figure 6:
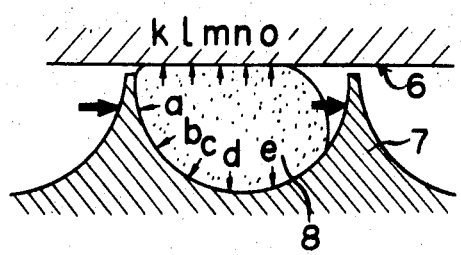

It will be apparent that, when helical rib 1 and shank 3 are rotated in the same direction at the same angular speed, rib 1 and shank 3 form the equivalent of a conventional conveyor screw, as represented at 7 on FIG. 6, and in which the screw thread is integral with the screw shank. In the case of such conventional conveyor screw 7, the frictional engagement of the material 8 to be conveyed with the surface of the conveyor screw 7 at a-b-c-d-e urges the material to rotate with conveyor screw 7, and such rotation of the material with the conveyor screw is frictionally resisted only by the frictional engagement of material 8 with the inner surface of housing 6 at k-l-m-n-o. To the extent that the material rotates with screw 7, by reason of the fact that the frictional resistance to rotation at k-l-m-n-o is inadequate to overcome the frictional forces inducing rotation at a-b-c-d-e, this reduces the rate at which the material is propelled axially along housing 6 toward the outlet 9. In the case of viscous materials, even if the portion of the material 8 adjacent the surface of housing 6 is frictionally held against rotation with screw 7, and hence is propelled axially toward the outlet, most of the energy imparted to the screw 7 for effecting its rotation is expended and in overcoming the frictional forces within the material and is not available for conveying the materially axially along housing 6.

Figure 5:
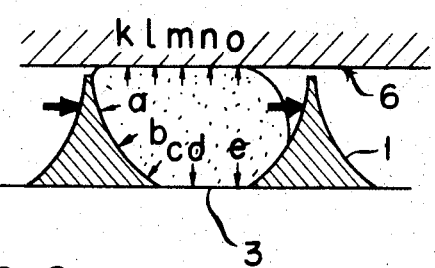
FIGS. 5 and 6 are diagrammatic views comparing the forces acting on the conveyed material in apparatus according to this invention and in the conventional screw conveyors, respectively.

However, in the case of conveying apparatus according to this invention, the shank 3 may be held stationary while helical rib 1 is rotated relative to housing 6 and shank 3. In such case, as shown on FIG. 5, the frictional forces tending to cause the material to rotate with rib 1 occur only at a-b-c, while the material is held against rotation with rib 1 at d-e, that is, at the surface of shank 3 exposed to the material between the successive turns of rib 1, as well as at k-l-m-n-o, that is, at the inner surface of housing 6. Thus, the frictional resistance to rotation of the material can be large as compared with the frictional forces urging the material to rotate with rib 1, with the result that a proportionately large conveying force is available to propel the material axially toward outlet 9.

Further, if shank 3 is rotated in the direction opposed to the rotation of rib 1, as on FIG. 4, whereby to provide a dynamic frictional force for opposing the rotation of the material with rib 1, the conveying force acting axially on the material may be further increased.

Thus, according to whether shank 3 is rotated in the direction opposed to the rotation of helical rib 1, is held stationary, or is rotated in the same direction as rib 1 at a lower or higher speed than the latter, the conveying force exerted by rotated rib 1 can be regulated to any desired value from a strong force directed toward outlet 9 through intermediate and weak forces in that direction and a zero conveying force to a negative force, that is, a force in the direction away from outlet 9.

Figure 2:
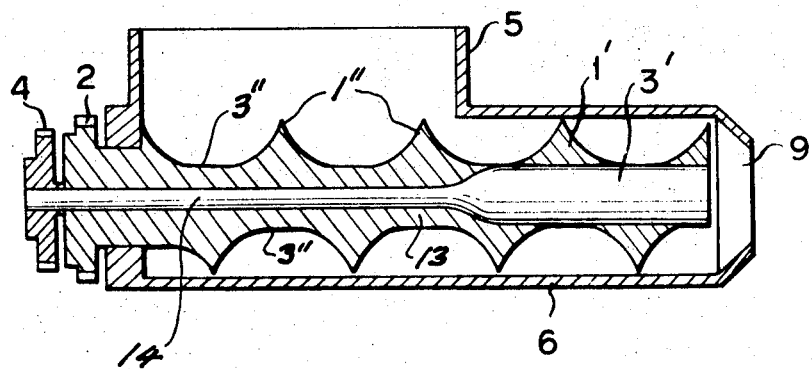
FIG. 2 is a view similar to that of FIG. 1, but showing another embodiment of the invention.

Further, in accordance with this invention, as shown on FIG. 2, only a part 3' of the shank exposed between the turns 1' of the helical rib which extend along such part 3' may be made independently rotatable with respect to the rib, while the remainder 3" of the surface of revolution located between turns 1" of the rib is defined by a tubular member 13 integral with the helical rib. In the foregoing arrangement, shank part 3' may be connected by a shaft 14 extending through tubular member 13 to gear 4, while gear 2 is integral with, or otherwise fixed to tubular member 13. Thus, the turns 1' and 1" of the helical rib are all rotatable with member 13, Thus, the turns 1' and 1" of the helical rib are all rotatable with member 13, whereby the surface portions 3" rotate at the same speed and in the same direction as the adjacent turn 1" of the continuous helical rib, while the shank part 3' exposed between turns 1' of the rib can be held stationary or rotated in the same direction as turns 1' or in the opposite direction.

It will be apparent that the above arrangement makes it possible to provide different conveying forces along the length of the helical rib. For example, in the embodiment shown on FIG. 2, if the shank part 3' is held stationary or rotated in the direction opposed to the rotation of the helical rib, the effective conveying force and hence the delivery rate by the turns 1' adjacent outlet 9 will be greater than the delivery rate by the turns 1" located upstream from the turns 1', whereby to avoid compression of the conveyed material. On the other hand, if shank part 3' is rotated in the same direction as turns 1', but at a higher speed, the delivery rate by turns 1' to outlet 9 may be made lower than the delivery rate by turns 1" to turns 1', whereby to compress the material as it is being conveyed. The latter effect, that is compression of the conveyed material, may also be achieved by disposing the shank part 3' which is independently rotatable adjacent the inlet 5 and by providing the shank integral with the turns of the helical rib adjacent the outlet so that, by holding the independently rotatable shank part stationary or by rotating such shank part in the direction opposed to the rotation of the helical rib, the delivery rate from the inlet is made higher than the delivery rate to the outlet to thereby compress the material therebetween.

The foregoing operational characteristic of apparatus according to the invention, that is, the possibility of compressing the conveyed material, is particularly advantageous in connection with the conveying of mixed materials. In the conveying of such mixed materials with a conventional conveyor screw, there is a tendency for air pockets or cavities to form in the material within the conveyor housing with the result that the delivery rate of the material from the outlet is uneven. However, with apparatus according to this invention arranged to compress the conveyed material, the trapped air pockets are eliminated and a uniform rate of delivery from the outlet is achieved.

Some experiments have been made using conveying apparatus according to the present invention. It a was found that viscous bean paste (comprising 100 parts of raw bean paste and 150 parts or more of sugar, by weight), the delivery of which by a conventional conveyor screw mechanism has been impossible, could be delivered without any difficulty by the apparatus embodying the present invention. In a test involving sawdust, the apparatus according to this invention delivered, over a given period of time, eight times as much sawdust as a conventional mechanism having a cylinder of the same shape, a screw of the same pitch, and the same speed of rotation. Finally, it was found that the delivery of dough by a conventional conveyor screw weakened the tensile strength of the gluten and reduced the retention of carbon dioxide gas produced by yeast fungi to below half of what it was before delivery. No such deterioration in the quality of the dough was observed, however, when a conveying apparatus according to this invention was employed.

In the embodiments of this invention specifically described above with reference to the drawings, the helical thread or rib extends from the shank or inner member 3 defining an inner surface of revolution toward the outer member or housing 6 defining a coaxial outer surface of revolution, and the helical rib is rotated relative to the fixed outer member 6 to provide the desired conveying effect. However, it is evident that the arrangement can be reversed, that is, the outer member may be rotatable, at least in part, relative to the rotated helical rib which extends therefrom toward the fixed inner member.

Further, although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention.

I claim:

1. Material conveying apparatus comprising inner and outer coaxial members having confronting surfaces of revolution defining a space therebetween through which the material is to be axially conveyed, at least one helical rib extending along the surface of revolution of one of said members and projecting therefrom in said space toward the surface of revolution of the other of said members to propel material axially along said space in response to rotation of said rib relative to said other member, at least a part of said one member defining a portion of the respective surface of revolution between the turns of said rib which extend along said part being independently rotatable with respect to said turns extending along said surface portion, and drive means connected with said part of said one member and said turns of the rib extending along said surface portion defined by said part and being operative to effect rotation of said part and said turns relative to said other member and relative to each other, whereby to control the frictional resistance to turning with said rib of the material to be conveyed.

2. Material conveying apparatus according to claim 1, in which the entire length of said one member along which said rib extends is independently rotatable with respect to said rib.

3. Material conveying apparatus according to claim 1, in which said surface portion defined by said part has an axial extent that is substantially less than the axial extent of said rib.

4. Material conveying apparatus comprising inner and outer coaxial members having confronting surfaces of revolution defining a space therebetween through which the material is to be axially conveyed, at least one helical rib extending along the surface of revolution of one of said members and projecting therefrom in said space toward the surface of revolution of the other of said members to propel material axially along said space in response to rotation of said rib relative to said other member, at least a part of said one member defining a portion of the respective surface of revolution between the turns of said rib which extend along said part being independently rotatable with respect to said turns extending along said surface portion, said surface portion defined by said part having an axial extent that is substantially less than the axial extent of said rib, said rib being integral with the remainder of said one member other than said part of the latter, and means for effecting relative rotation of said part of said one member and said turns of the rib extending along said surface portion defined by said part, whereby to control the frictional resistance to turning with said rib of the material to be conveyed.

5. Material conveying apparatus according to claim 1, in which said one member is said inner member and said other member is outer member and is stationary.

6. Material conveying apparatus according to claim 5, in which said surface portion defined by said part of the inner member is axially coextensive with said helical rib.

7. Material conveying apparatus according to claim 5, in which said outer member has an inlet and an outlet for the material to be conveyed at locations spaced apart along said outer member, and said surface portion defined by said part of the inner member extends from adjacent said inlet.

8. Material conveying apparatus comprising inner and outer coaxial members having confronting surfaces of revolution defining a space therebetween through which the material is to be axially conveyed, said outer member being stationary, at least one helical rib extending along the surface of revolution of said inner member and projecting therefrom in said space toward the surface of revolution of said outer member to propel material axially along said space in response to rotation of said rib relative to said outer member, at least a part of said inner member defining a portion of the respective surface of revolution between the turns of said rib which extend along said part being independently rotatable with respect to said turns extending along said surface portion, said surface portion defined by said part having an axial extent that is substantially less than the axial extent of said rib, the turns of said rib extending along the remainder of said inner member other than said part being fixed with respect to said remainder of the inner member, and means for effecting relative rotation of said part of said inner member and said turns of the rib extending along said surface portion defined by said part, whereby to control the frictional resistance to turning with said rib of the material to be conveyed.

9. Material conveying apparatus according to claim 8, in which said outer member has an inlet and an outlet for the material to be conveyed at locations spaced apart along said outer member, and said surface portion defined by said part of the inner member extends to adjacent said outlet.

10. Material conveying apparatus according to claim 1, in which said other member constitutes a fixed outer housing containing said one member and said rib, and said one member forms the shank of a conveyor screw having its thread formed by said helical rib with the latter being independently rotatable with respect to at least the axial section of the shank formed by said part of said one member.